United States Patent
Hosseini et al.

(10) Patent No.: US 12,069,767 B2
(45) Date of Patent: *Aug. 20, 2024

(54) SIGNALING OF CAPABILITY INFORMATION BY USER EQUIPMENT

(71) Applicant: QUALCOMM Incorporated, San Diego, CA (US)

(72) Inventors: Seyedkianoush Hosseini, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/326,848

(22) Filed: May 31, 2023

(65) Prior Publication Data

US 2023/0388777 A1 Nov. 30, 2023

Related U.S. Application Data

(63) Continuation of application No. 17/170,786, filed on Feb. 8, 2021, now Pat. No. 11,706,610.

(Continued)

(51) Int. Cl.
*H04W 8/22* (2009.01)
*H04W 72/20* (2023.01)

(52) U.S. Cl.
CPC ............. *H04W 8/22* (2013.01); *H04W 72/20* (2023.01)

(58) Field of Classification Search
CPC ....... H04W 8/22; H04W 72/20; H04W 72/21; H04W 8/24; H04L 5/0053; H04L 5/0092; H04L 5/001

See application file for complete search history.

(56) References Cited

U.S. PATENT DOCUMENTS

2018/0343575 A1 11/2018 Ogawa et al.
2019/0173626 A1 6/2019 Wang et al.
(Continued)

FOREIGN PATENT DOCUMENTS

CN 111901873 A 11/2020
EP 3771131 A1 1/2021
(Continued)

OTHER PUBLICATIONS

Ad-Hoc Chair (NTT Docomo., et al.,): "Chairman's Notes of AI 7.1.6 UE Features List", 3GPP TSG-RAN WG1 #98, 3GPP Draft; R1-1909755 Session Notes RAN1#98 7.1.6_V4, 3rd Generation Partnership Project (3GPP), Mobile Competence Centre; 650, Route Des Lucioles; F-06921 Sophia-Antipolis Cedex; France, vol. RAN WG1, No. Prague, CZ; Aug. 26, 2019-Aug. 30, 2019, Sep. 3, 2019 (Sep. 3, 2019), 3 Pages, XP051766348, p. 1 p. 2, line 12-line 21.

(Continued)

*Primary Examiner* — Ayaz R Sheikh
*Assistant Examiner* — Tarell A Hampton
(74) *Attorney, Agent, or Firm* — ArentFox Schiff LLP

(57) ABSTRACT

In an aspect of the disclosure, a method, a computer-readable medium, and an apparatus are provided. The apparatus may be a UE. The apparatus may be configured to receive a request for UE capability information from a network. The apparatus may be further configured to transmit, in response to the request, UE capability information indicating a first set of value pairs associated with monitoring occasions for a control channel of at least one first component carrier and a second set of value pairs associated with monitoring occasions for a control channel of at least one second component carrier, and each of the first and second sets of value pairs may include a first value corresponding to a minimum time separation between consecu- (Continued)

tive spans for the monitoring occasions and a second value corresponding to a span length for the monitoring occasions.

24 Claims, 7 Drawing Sheets

Related U.S. Application Data

(60) Provisional application No. 62/972,237, filed on Feb. 10, 2020.

(56) References Cited

U.S. PATENT DOCUMENTS

| | | | |
|---|---|---|---|
| 2019/0200406 A1 | 6/2019 | Henttonen et al. | |
| 2019/0208507 A1 | 7/2019 | Xiong et al. | |
| 2019/0342907 A1 | 11/2019 | Huang et al. | |
| 2020/0067685 A1 | 2/2020 | Awad et al. | |
| 2020/0329389 A1 | 10/2020 | Hosseini et al. | |
| 2020/0351681 A1* | 11/2020 | Salah | H04W 72/23 |
| 2020/0389847 A1 | 12/2020 | Deng et al. | |
| 2021/0029726 A1 | 1/2021 | Papasakellariou | |
| 2021/0168782 A1 | 6/2021 | Hamidi-Sepehr et al. | |
| 2021/0250753 A1 | 8/2021 | Hosseini et al. | |
| 2021/0377918 A1 | 12/2021 | Saber et al. | |
| 2022/0182860 A1 | 6/2022 | Chatterjee et al. | |
| 2022/0329399 A1* | 10/2022 | Kittichokechai | H04L 5/0053 |

FOREIGN PATENT DOCUMENTS

| | | |
|---|---|---|
| EP | 3876467 A1 | 9/2021 |
| WO | 2019059675 A1 | 3/2019 |
| WO | 2019191943 A1 | 10/2019 |
| WO | 2020072963 A1 | 4/2020 |
| WO | 2020206086 A1 | 10/2020 |
| WO | 2021024184 A1 | 2/2021 |
| WO | 2021059524 A1 | 4/2021 |
| WO | 2021062843 A1 | 4/2021 |
| WO | 2021062879 A1 | 4/2021 |

OTHER PUBLICATIONS

Huawei., et al., "Introduction of EN-DC Contiguous and Non-Contiguous", 3GPP TSG-RAN2 Meeting#104, 3GPP Draft; R2-1818028 CR on Introduction of EN-DC Contiguous and Non-Contiguous, 3rd Generation Partnership Project (3GPP), Mobile Competence Centre; 650, Route Des Lucioles; F-06921 Sophia-Antipol, vol. RAN WG2, No. Spokane, Washington, USA; Nov. 12, 2018-Nov. 16, 2018, Nov. 12, 2018 (Nov. 12, 2018), 7 Pages, XP051557535, p. 3, paragraph 4.2.7.5, p. 6, paragraph 4.2.7.7.

Huawei., et al., "UE Feature Discussion for Cross-Carrier Scheduling with Different Numerologies", 3GPP TSG RANWG1 Meeting #98, 3GPP Draft, R1-1909311, 3rd Generation Partnership Project, Mobile Competence Centre, 650, Route Des Lucioles, F-06921 Sophia-Antipolis Cedex, France, vol. RAN WG1, No. Prague, Czech Republic, Aug. 26, 2019-Aug. 30, 2019, Aug. 17, 2019, 10 Pages, XP051765918, The whole document, p. 1, paragraph 2, p. 2, paragraph 3, figures 1-6, Appendix A, 3-2 to 3.5b.

International Preliminary Report on Patentability—PCT/US2021/017265, The International Bureau of WIPO—Geneva, Switzerland, Aug. 25, 2022.

International Search Report and Written Opinion—PCT/US2021/017265—ISA/EPO—Apr. 16, 2021.

Liu Z., et al., "Research on the Key Technologies of LTE-Advanced Monitoring and Analysis", Journal of Electronic Measurement and Instrument, vol. 12, Dec. 15, 2017; with English Abstract.

\* cited by examiner

SIGNALING OF CAPABILITY INFORMATION BY USER EQUIPMENT

CROSS REFERENCE TO RELATED APPLICATION(S)

This patent application is a continuation of U.S. Non-Provisional application Ser. No. 17/170,786 entitled "SIGNALING OF CAPABILITY INFORMATION BY USER EQUIPMENT" and filed on Feb. 8, 2021, which the benefit of U.S. Provisional Application Ser. No. 62/972,237, entitled "CAPABILITY SIGNALING FOR A CONTROL CHANNEL WITH ULTRA-RELIABLE LOW-LATENCY COMMUNICATION" and filed on Feb. 10, 2020, the disclosure of which is expressly incorporated by reference herein in its entirety.

BACKGROUND

Technical Field

The present disclosure generally relates to communication systems, and more particularly, to a user equipment configured to transmit a capability message indicating support for at least two mobile communication standards of at least one radio access technology.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an example radio access network (RAN), the network configures communication with a user equipment (UE) according to the functionality of which the UE is capable. Thus, the UE should inform the network of the UE capabilities, for example, via a UE capability information message. The network may request such a UE capability information message from the UE by transmitting a UE capability enquiry message. For example, when the UE initially attaches or registers in the RAN, the network may transmit UE capability enquiry message.

Responsive to the UE capability enquiry message, the UE may transmit the UE capability information message, which may indicate capability information related to support for carrier aggregation, modulation levels, coding rates, and so forth. In particular, the UE capability message may indicate the capability of the UE to detect control information on a control channel in a search space during a monitoring occasion, as different UEs may have different capabilities for detecting a control channel intended for the UE.

As mobile communication standards (or "releases") of a radio access technology (RAT) evolve, the capabilities of UEs may commensurately evolve. UEs capable of communication according to newer mobile communication standards may still be capable of communication with network elements (e.g., base stations) that are not configured for the newer mobile communication standards. However, UEs may lack a mechanism for informing the network of capabilities to receive certain information (e.g., control information) from both base stations configured for the newer (e.g., current) mobile communication standards and base stations configured for the older (e.g., legacy) mobile communication standards.

The present disclosure describes various techniques and solutions for a UE to transmit UE capability information to a network that indicates a capability for receiving control information on component carriers (CCs) configured for a first mobile communication capability of a RAT and receiving control information on CCs configured for a second mobile communication capability of the RAT. For example, the UE may indicate the capability of the UE to detect control information on a control channel on a first component carrier and to detect control information on a control channel on a second component carrier.

In an aspect of the disclosure, a method, a computer-readable medium, and an apparatus are provided. The apparatus may be a UE. The apparatus may be configured to receive a request for UE capability information from a network. The apparatus may be further configured to transmit, in response to the request, UE capability information indicating a first set of value pairs associated with monitoring occasions for a control channel of at least one first component carrier and a second set of value pairs associated with monitoring occasions for a control channel of at least one second component carrier, and each of the first and second sets of value pairs may include a first value corresponding to a minimum time separation between consecutive spans for monitoring occasions and a second value corresponding to a span length for monitoring occasions.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
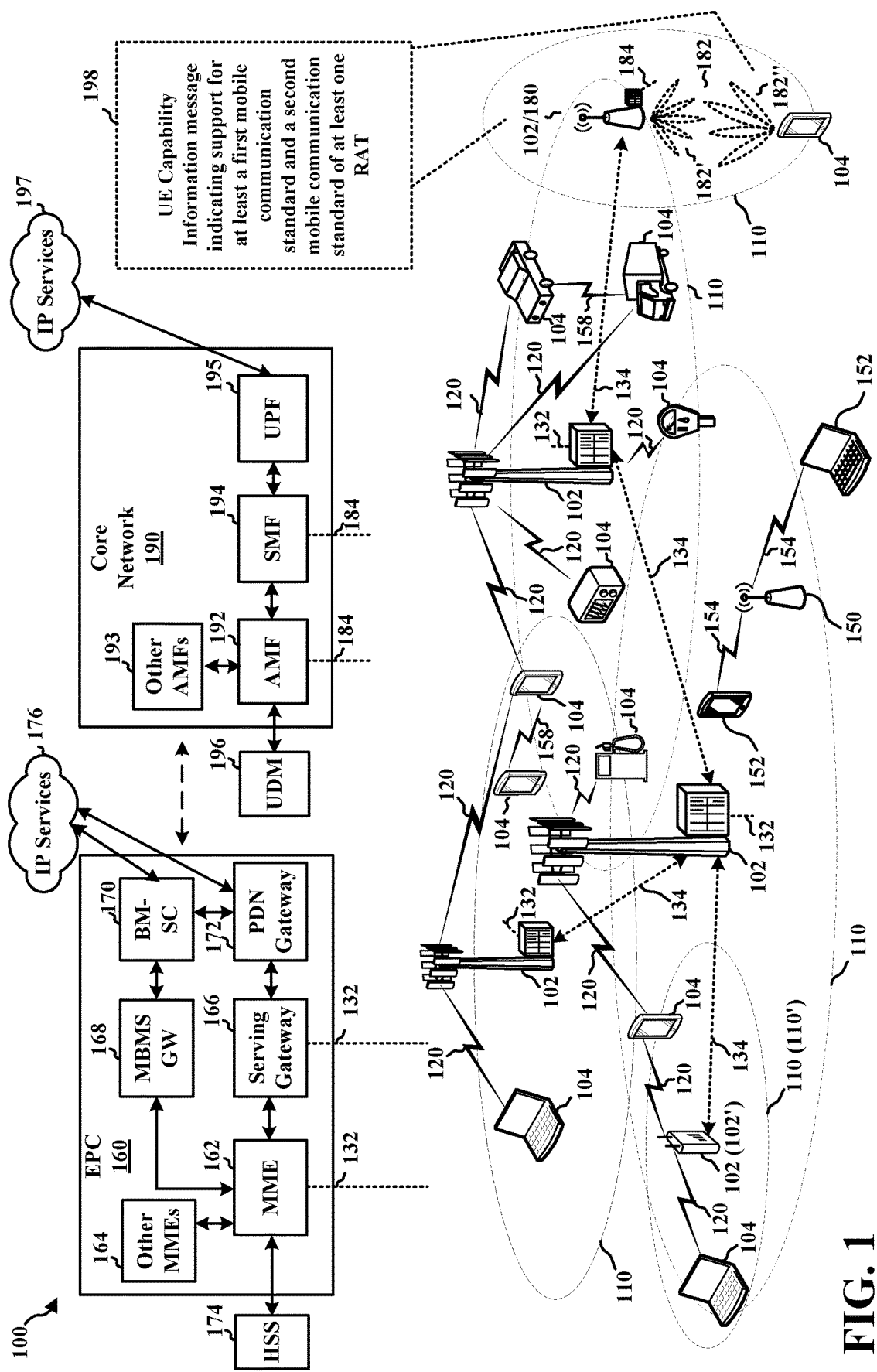
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, user equipment(s) (UE) 104, an Evolved Packet Core (EPC) 160, and another core network 190 (e.g., a Core (5GC)). The base stations 102 may include macrocells (high power cellular base station) and/or small cells (low power cellular base station). The macrocells include base stations. The small cells include femtocells, picocells, and microcells.

The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (e.g., 51 interface). The base stations 102 configured for 5G New Radio (NR) (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, Multimedia Broadcast Multicast Service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y megahertz (MHz) (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 gigahertz (GHz) unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, an MBMS Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a Packet Switch (PS) Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides Quality of Service (QoS) flow and session management. All user IP packets are transferred through the UPF 195. The UPF 195 provides UE IP address allocation as well as other functions. The UPF 195 is connected to the IP Services 197. The IP Services 197 may include the Internet, an intranet, an IMS, a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the present disclosure may focus on 5G NR, the concepts and various aspects described herein may be applicable to other similar areas, such as LTE, LTE-Advanced (LTE-A), Code Division Multiple Access (CDMA), Global System for Mobile communications (GSM), or other wireless/radio access technologies.

Referring again to FIG. 1, in certain aspects, a base station 102/180 may be configured to transmit a request (or enquiry) for UE capability information to a UE 104. For example, the UE 104 may receive the request (or enquiry) when the UE 104 attaches to an access network that includes the base station 102/180. Based on the request (or enquiry), the UE 104 may transmit a UE Capability Information message that indicates the UE 104 supports at least a first mobile communication capability and a second mobile communication capability of at least one RAT (198).

According to various aspects of the present disclosure, the UE Capability Information message indicating support for at least a first mobile communication capability and a second mobile communication capability of at least one RAT (198) may indicate a first set of value pairs associated with monitoring occasions for a control channel of at least one first component carrier (CC) and a second set of value pairs associated with monitoring occasions for a control channel of at least one second CC. Each of the first and second sets of value pairs may include a first value corresponding to a minimum time separation between consecutive spans for the monitoring occasions and a second value corresponding to a span length for the monitoring occasions. Potentially, the UE 104 may be configured to monitor the control channel of the at least one first CC and monitor the control channel of the at least one second CC, e.g., if so configured by the network based on the UE Capability Information message.

Figure 2:
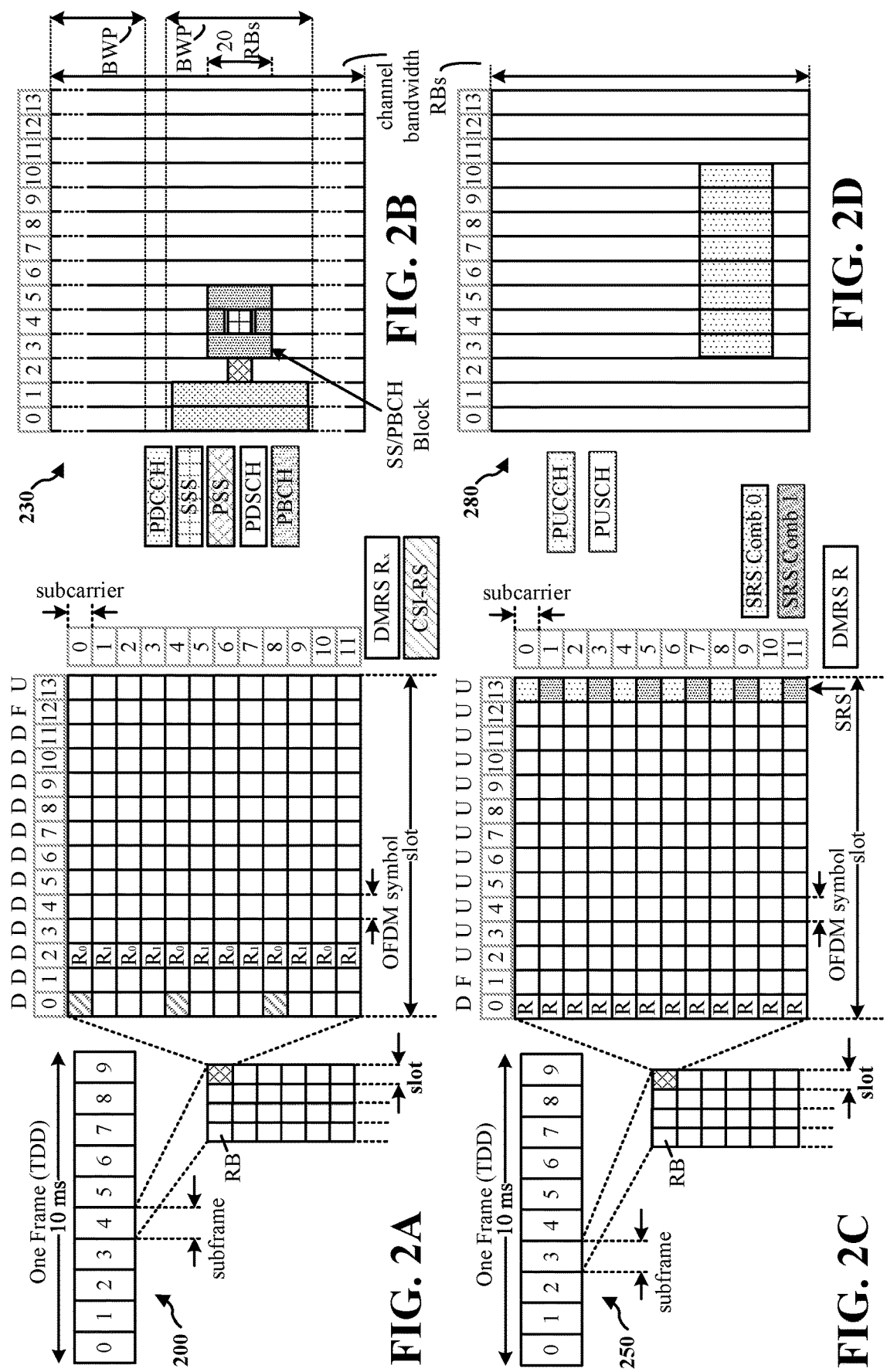
FIG. 2A is a diagram illustrating an example of a first frame, in accordance with various aspects of the present disclosure.
FIG. 2B is a diagram illustrating an example of downlink channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a NR frame structure that is TDD.

Other wireless communication technologies may have a different frame structure and/or different channels. A frame, e.g., of 10 milliseconds (ms), may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency-division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration different numerologies µ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology µ, there are 14 symbols/slot and $2^\mu$ slots/subframe. The subcarrier spacing and symbol length/duration are a function of the numerology. The subcarrier spacing may be equal to $2^\mu*15$ kilohertz (kHz), where µ is the numerology 0 to 4. As such, the numerology µ=0 has a subcarrier spacing of 15 kHz and the numerology µ=4 has a subcarrier spacing of 240 kHz. The symbol length/duration is inversely related to the subcarrier spacing. FIGS. 2A-2D provide an example of slot configuration 0 with 14 symbols per slot and numerology µ=2 with 4 slots per subframe. The slot duration is 0.25 ms, the subcarrier spacing is 60 kHz, and the symbol duration is approximately 16.67 microseconds (µs). Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2A, some of the REs carry at least one pilot and/or reference signal (RS) for the UE. In some configurations, an RS may include at least one demodulation RS (DM-RS) (indicated as Rx for one particular configuration, where 100x is the port number, but other DM-RS configurations are possible) and/or at least one channel state information (CSI) RS (CSI-RS) for channel estimation at the UE. In some other configurations, an RS may additionally or alternatively include at least one beam measurement (or management) RS (BRS), at least one beam refinement RS (BRRS), and/or at least one phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIGs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests (SRs), a channel quality indicator (CQI), a precoding matrix indicator (PMI), a rank indicator (RI), and hybrid automatic repeat request (HARQ) acknowledgement (ACK)/non-acknowledgement (NACK) feedback. The PUSCH carries data, and may additionally be used to carry a buffer status report (BSR), a power headroom report (PHR), and/or UCI.

Figure 3:
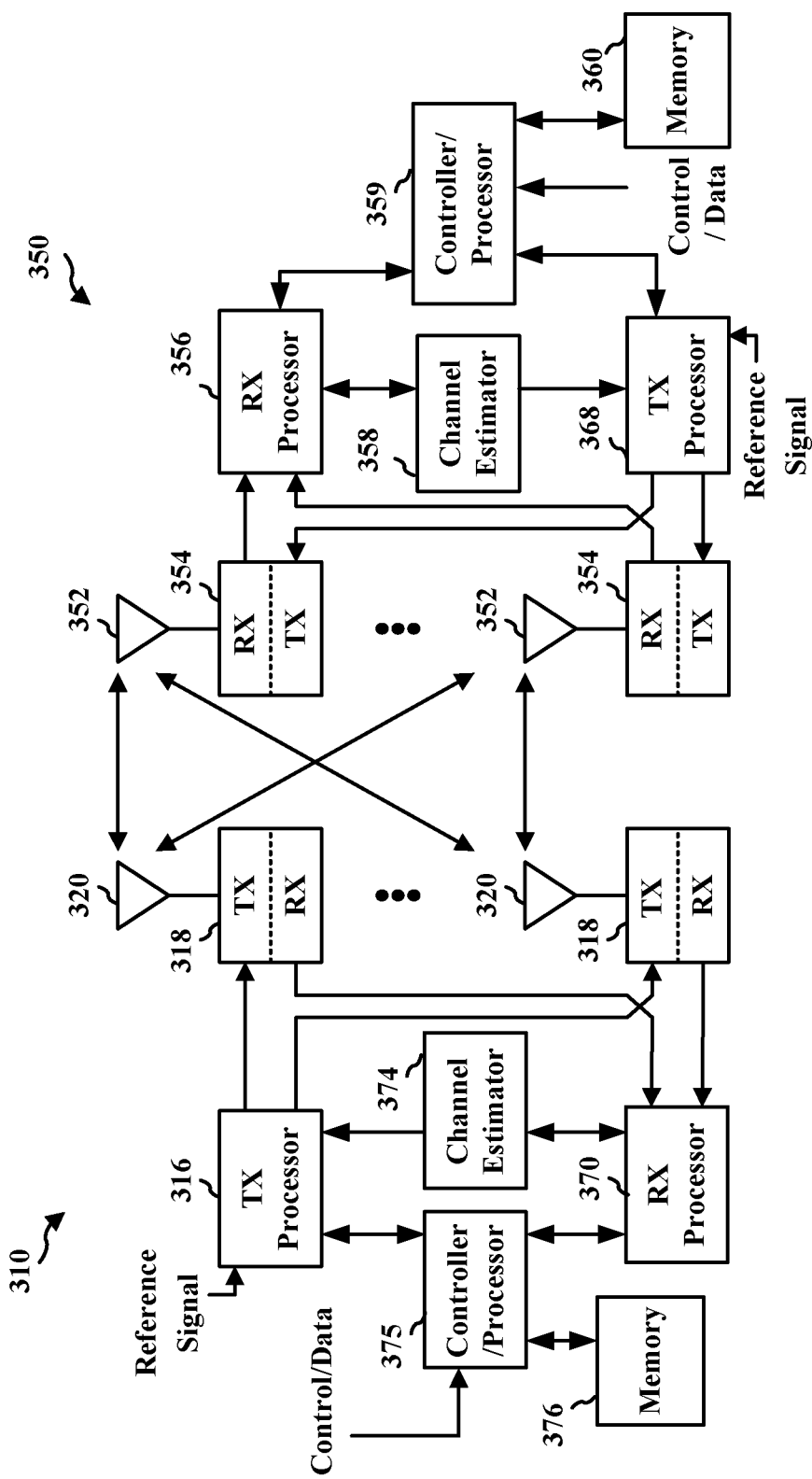
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIB s) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with (198) of FIG. 1.

According to various aspects of the present disclosure, a RAN may configure communication with a UE according to the functionality of which the UE is capable. Thus, the UE should inform the network of the UE capabilities, for example, via a UE capability information message. The network may request such a UE capability information message from the UE by transmitting a UE capability enquiry message. For example, when the UE initially attaches or registers in the RAN, the network may transmit UE capability enquiry message.

Responsive to the UE capability enquiry message, the UE may transmit the UE capability information message, which may indicate capability information related to support for carrier aggregation, modulation levels, coding rates, and so forth. In particular, the UE capability message may indicate the capability of the UE to detect control information on a control channel in a search space during a monitoring occasion, as different UEs may have different capabilities for detecting a control channel intended for the UE.

A RAT associated with the network may adopt ongoing updates through iterations of mobile communication standards or capabilities. For example, 3GPP RATs (e.g., 5G NR) may follow "releases" that introduce new and/or updated functionality, procedures, etc., such as Release 15, Release 16, Release 17, and so forth. UEs may be configured to comply with newer mobile communications capabilities and/or standards (e.g., 3GPP Release 16 and/or 17 of 5G NR, as well as further releases), while also complying with older mobile communications capabilities and/or standards (e.g., 3GPP Release 15 of 5G NR, LTE, etc.). However, UEs may lack a mechanism for informing the network of capabilities to receive certain information (e.g., control information) from both base stations configured for the newer (e.g., current) mobile communication capabilities and/or standards and base stations configured for the older (e.g., legacy) mobile communication capabilities and/or standards.

The present disclosure describes various techniques and solutions for a UE to transmit UE capability information to a network that indicates a capability for receiving control information on CCs configured for at least a first mobile communication capability of at least one RAT and receiving control information on CCs configured for a second mobile communication capability of the at least one RAT. For example, the UE may indicate the capability of the UE to detect control information on a control channel on a first CC and to detect control information on a control channel on a second CC.

Figure 4:
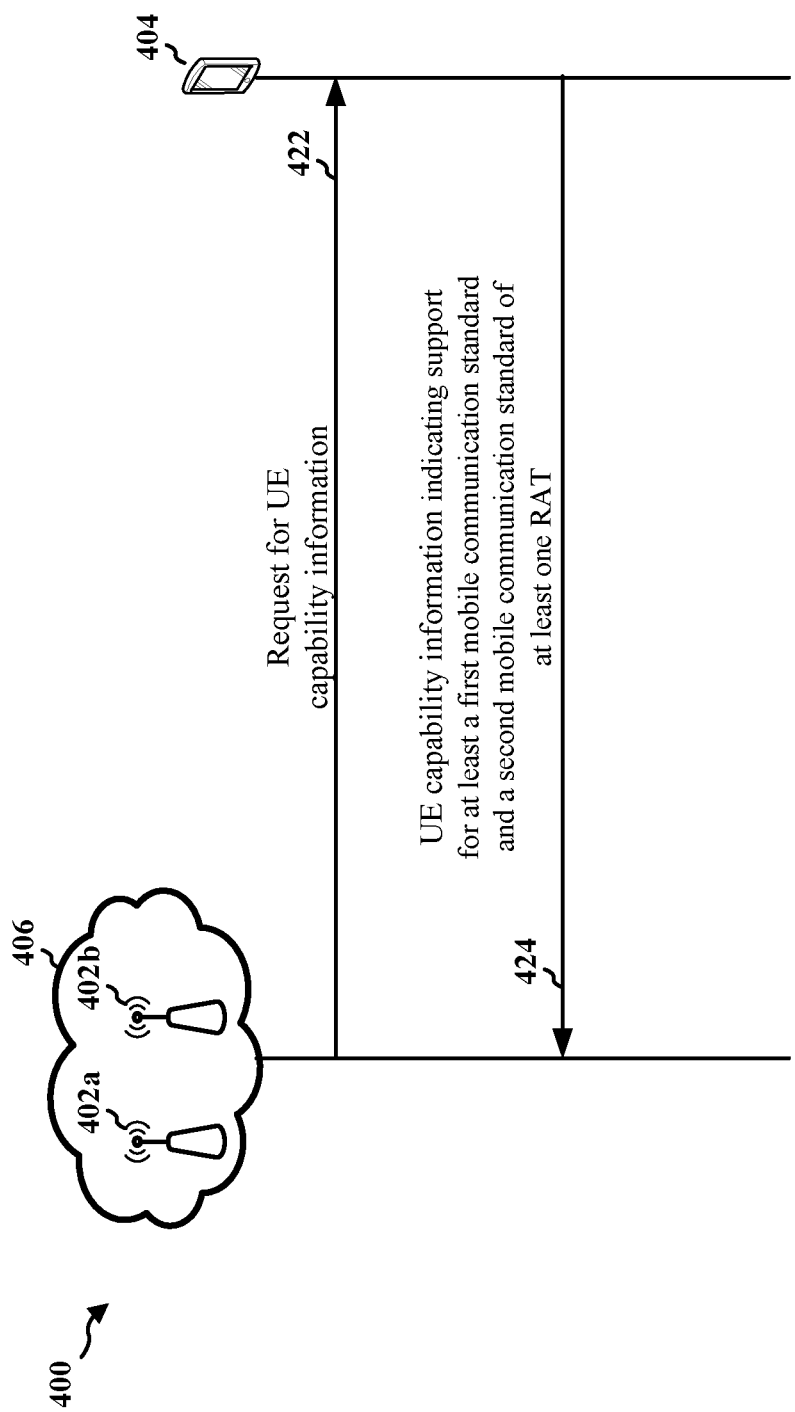
FIG. 4 is a call flow diagram illustrating example communications flow between a network and a UE.

FIG. 4 is a call flow diagram 400 illustrating example operations in a network 406 of a RAT. The network 406 may include at least two base stations 402a-b. A UE 404 may be configured to communicate with the network 406. For example, each of the base stations 402a-b may be configured to provide a respective serving cell on which the UE 404 may operate. In order to operate on and communicate in the serving cells provided by the base stations 402a-b, each of the base stations 402a-b may transmit respective control information on a control channel (e.g., PDCCH) to the UE 404.

In some aspects, the base stations 402a-b may be configured to communicate according to different mobile communications standards of the RAT. For example, the first base station 402a may be configured to communicate according to a first mobile communication capability of the RAT (e.g., 3GPP Release 16 and/or 17 of 5G NR), whereas the second base station may be configured to communicate according to a second mobile communication capability of the RAT (e.g., 3GPP Release 15 of NR and/or LTE). Able to operate on both serving cells, the UE 404 may be configured to communicate according to both the first and second mobile communication capabilities of the RAT.

In order to detect the control information on the control channel, the UE 404 may be configured to perform blind decodes (BDs) of sets of CCEs at different aggregation levels (e.g., 1, 2, 4, 8, 16). The UE 404 may perform a BD in a monitoring occasion. A monitoring occasion may be a time domain location in which one or more symbols of a control resource set (CORESET) is found. A CORESET may include one or more search spaces, and each search space may be a set of CCEs that includes, at different aggregation levels (e.g., 2, 4, 8, 16), the control information on the control channel for the UE 404. However, the number of CCEs and number of BDs may be constrained to respective limits (e.g., a maximum limit of CCEs and a maximum limit of BDs).

The UE 404 may be capable of monitoring and decoding the control information on the control channel on the first CC according to the first mobile communication capability differently from on the second CC according to the second mobile communication capability. However, the UE 404 may need to inform the network 406 of the capability of the UE 404 to detect the control information on the control channel on the first CC(s) (from the first base station 402a), and to detect control information on a control channel on the second CC(s) (from the second base station 402b).

Therefore, the network 406 may be configured to transmit a request 422 for UE capability information to the UE 404. For example, the request 422 may include a UE Capability Enquiry message, which may be associated with attachment by the UE 404 to the network 406. In some aspects, the request 422 may indicate a set of bands for which the UE 404 is to report capabilities of the UE. For example, the request 422 may indicate a first subset of bands corresponding to the first base station 402a and a second subset of bands corresponding to the second base station 402b.

The UE 404 may receive the request 422 and, in response to the request 422, the UE 404 may transmit a UE Capability Information message 424 indicating support for the first mobile communication capability in the first CC(s) and the second mobile communication capability in the second CC(s).

The UE 404 may generate the UE Capability Information message 424 to include information indicating the capabilities of the UE 404, and the information may include a set of values that each corresponds with a respective capability. For example, the set of values may be referred to as "feature groups" (or "FGs"), and each feature group may correspond with a UE capability. Potentially, one value may indicate multiple capabilities.

The UE 404 may generate the UE Capability Information message 424 according to preconfigured information stored in the UE 404. For example, the UE 404 may generate the UE Capability Information message 424 to include a set of values that each may be preconfigured to be mapped to at least one capability of the UE 404. Such capabilities may be related to signaling, transmitting, receiving, beamforming, processing, and so forth. Effectively, the UE Capability Information message 424 may inform the network 406 of how to communicate with the UE 404, e.g., according to how the UE 404 is configured and able to communicate information.

In some aspects, information in the UE Capability Information message 424, such as a feature group, may correspond and/or may be applicable to at least one case, for example, including Case 1, Case 2, Case 3, and so forth. Each case may correspond to capability of a UE to support for at least one of TDD and/or FDD in at least one of FR1 and/or FR2.

In one configuration, the second mobile communication capability may include a first feature group (e.g., feature group 3-1 associated with basic downlink control channel) indicating, for type 1 common search space (CSS) with dedicated RRC configuration, type 3 CSS, and UE-specific search space (UE-SS), a monitoring occasion is within the first 3 OFDM symbols of a slot. In another configuration, the second mobile communication capability may include a second feature group (e.g., feature group 3-2 associated with PDCCH monitoring on any span of up to 3 consecutive OFDM symbols of a slot) indicating, for a given UE, all search space configurations are within the same span of 3 consecutive OFDM symbols of a slot.

In a further configuration, the second mobile communication capability may include a third feature group (e.g., feature group 3-5) indicating, for type 1 CSS with dedicated RRC configuration, type 3 CSS, and UE-SS, a monitoring occasion can be any OFDM symbol(s) of a slot (e.g., for Case 2). In still another configuration, the second mobile communication capability may include a fourth feature group (e.g., feature group 3-indicating, for type 1 CSS with dedicated RRC configuration, type 3 CSS, and UE-SS, a monitoring occasion can be any OFDM symbol(s) of a slot with a DCI gap (e.g., for Case 2).

In yet a further configuration, the second mobile communication capability may include a fifth feature group (e.g., feature group 3-5b) indicating all control channel (e.g., PDCCH) monitoring occasions can be any OFDM symbol(s) of a slot with a span gap (e.g., for Case 2). An example of the fifth feature group may be given below in Table 1.

TABLE 1

| 3-5b | All PDCCH monitoring occasion can be any OFDM symbol(s) of a slot with a span gap (e.g., for Case 2) | PDCCH monitoring occasions of FG-3-1, plus additional PDCCH monitoring occasion(s) can be any OFDM symbol(s) of a slot (e.g., for Case 2), and for any two PDCCH monitoring occasions belonging to different spans, where at least one of them is not the monitoring occasions of FG-3-1, in same or different search spaces, there is a minimum time separation of X OFDM symbols (including the cross-slot boundary case) between the start of two spans, where each span is of length up to Y consecutive OFDM symbols of a slot. Spans do not overlap. Every span is contained in a single slot. The same span pattern repeats in every slot. The separation between consecutive spans within and across slots may be unequal but the same (X, Y) limit must be satisfied by all spans. Every monitoring occasion is fully contained in one span. In order to determine a suitable span pattern, first a bitmap b(l), $0 <= l <= 13$ is generated, where b(l) = 1 if symbol l of any slot is part of a monitoring occasion, b(l) = 0 otherwise. The first span in the span pattern begins at the smallest l for which b(l) = 1. The next span in the span pattern begins at the smallest l not included in the previous span(s) for which b(l) = 1. The span duration is max{maximum value of all CORESET durations, minimum value of Y in the UE reported candidate value} except possibly the last span in a slot which can be of shorter duration. A particular PDCCH monitoring configuration meets the UE capability limitation if the span arrangement satisfies the gap separation for at least one (X, Y) in the UE reported candidate value set in every slot, including cross slot boundary.<br>For the set of monitoring occasions which are within the same span:<br>Processing one unicast DCI scheduling DL and one unicast DCI scheduling UL per scheduled CC across this set of monitoring occasions for FDD<br>Processing one unicast DCI scheduling DL and two unicast DCI scheduling UL per scheduled CC across this set of monitoring occasions for TDD<br>Processing two unicast DCI scheduling DL and one unicast DCI scheduling UL per scheduled CC across this set of monitoring occasions for TDD<br>The number of different start symbol indices of spans for all PDCCH monitoring occasions per slot, including PDCCH monitoring occasions of FG-3-1, is no more than floor(14/X) (X is minimum among values reported by UE).<br>The number of different start symbol indices of PDCCH monitoring occasions per slot including PDCCH monitoring occasions of FG-3-1, is no more than 7.<br>The number of different start symbol indices of PDCCH monitoring occasions per half-slot including PDCCH monitoring occasions of FG-3-1 is no more than 4 in SCell. | pdcch-Monitoring AnyOccasionsWithSpanGap (X, Y):<br>set1 = (7, 3);<br>set2 = (4, 3) and (7, 3);<br>set3 = (2, 2) and (4, 3) and (7, 3). |
|---|---|---|---|

Figure 5:
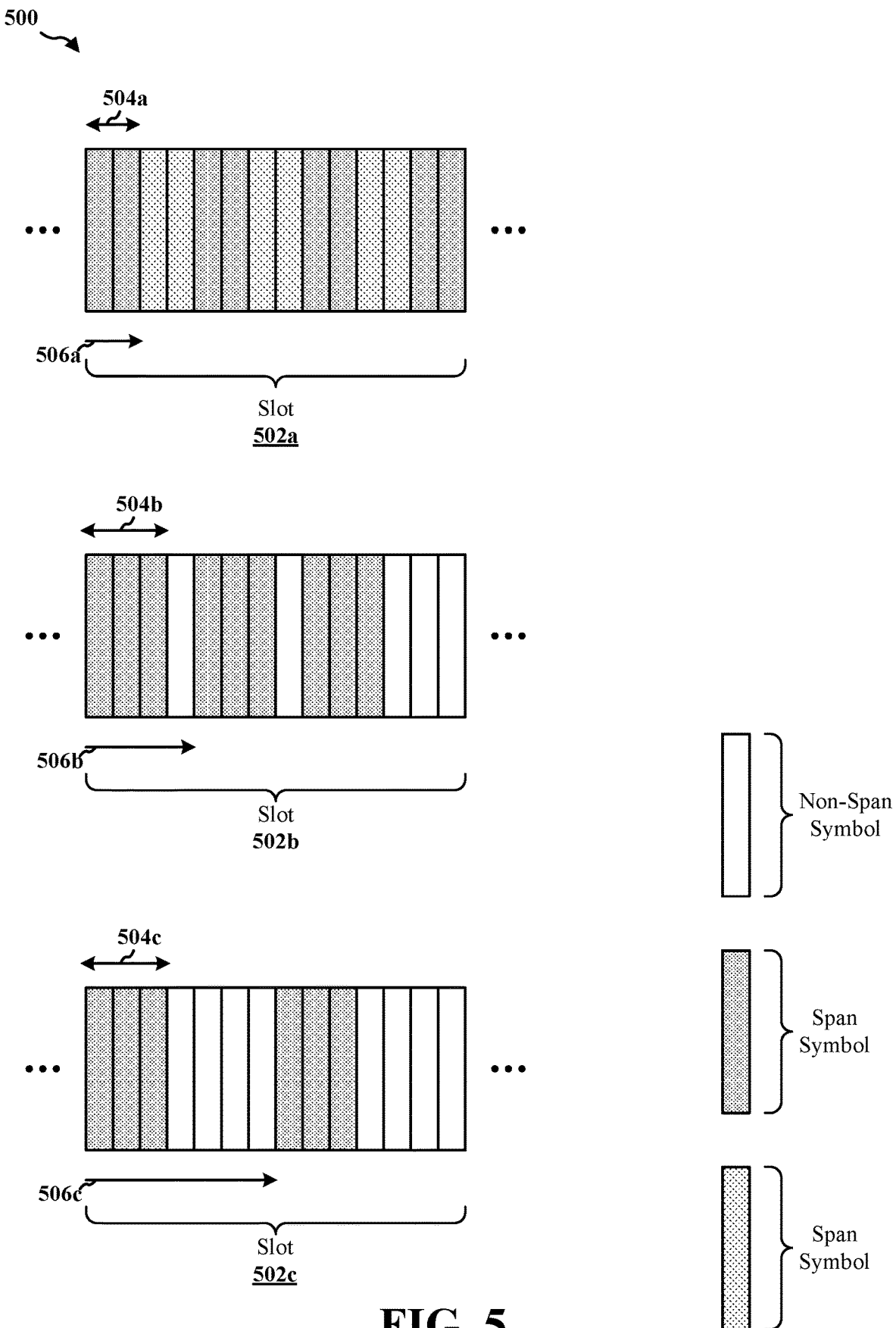
FIG. 5 is a diagram illustrating example configurations of timing structures that may be used for communication in a wireless communications network.

As described with respect to feature groups, every monitoring occasion may be contained within a span, which may include a set of symbols. Referring to FIG. 5, a diagram 500 illustrates example slots 502a-c. Each of the slots 502a-c may include a set of spans. Referring to the first slot 502a, at most 7 spans are included. Each of the spans may have a length 504a of 2 symbols, and each of the spans may have a separation 506a of at least 2 symbols with respect to the first symbol of each span (including across slot boundaries). Thus, the span pattern, or value pairs, for the slot 502a may be (2, 2), as X is equal to 2 and Y is equal to 2.

Referring to the second slot 502b, at most 3 spans are included. Each of the spans may have a length 504b of 3 symbols, and each of the spans may have a separation 506b of at least 4 symbols with respect to the first symbol of each span (including across slot boundaries). Thus, the span pattern, or value pairs, for the slot 502b may be (4, 3), as X is equal to 4 and Y is equal to 3.

Referring to the third slot 502c, at most 2 spans are included. Each of the spans may have a length 504c of 3 symbols, and each of the spans may have a separation 506c of at least 7 symbols with respect to the first symbol of each span (including across slot boundaries). Thus, the span pattern, or value pairs, for the slot 502c may be (7, 3), as X is equal to 4 and Y is equal to 3.

The span patterns shown in the slots 502a-c may be of different complexities, as each span pattern may include a different number of CCEs, and therefore, involve a greater number of BDs by a UE. The span pattern of (2, 2) may be the most complex, the span pattern (4, 3) may be relatively less complex, and the span pattern (7, 3) may be the least complex. According to the second mobile communication capability, then, a UE that is able to support the span pattern of value pair (2, 2) should also be able to support span patterns of value pairs (4, 3) and (7, 3). Similarly, a UE that is able to support span pattern of value pair (4, 3) should also be able to support the span pattern of value pair (7, 3). Potentially, a UE may only be able to support the span pattern of value pair (7, 3).

For the second mobile communication capability, the limits on the number of non-overlapping CCEs and BDs may be defined on a per-slot basis. A base station could configure a large number of CCEs and BDs (potentially, all CCEs and BDs) within one span of a lot. Such a configuration may appreciably increase the UE complexity, especially when the UE 404 is configured to communicate according to capabilities having relatively shorter timelines, such as those for ultra-reliable low-latency communication (URLLC) use cases and/or UE processing capability 2 (e.g., in which a UE may have a limited number of symbols to report HARQ-ACK feedback for the PDCCH, such as 5 symbols for a subcarrier spacing (SCS) of 15 kHz, 5.5 symbols for an SCS of 30 kHz, and/or 11 symbols for an SCS of 60 kHz.

However, if one of the base stations 404a-b (or other scheduler) configures the CCEs and BDs to be distributed across different spans, the number of CCEs and BDs per span may be insufficient to carry control information on a control channel to the UE 404. For example, with an SCS of 30 KHz and a span pattern of (X, Y) equal to value pair (2, 2), each span may include only 8 CCEs, and only one candidate for the control channel of aggregation level 8 can be supported (or 2 candidates of aggregation level 4, etc.).

The first mobile communication capability may be different from the second mobile communication capability in this regard, e.g., through differences in UE complexity and scheduler flexibility for URLLC and/or enhanced URLLC (eURLLC). In the first mobile communication capability, a new control channel monitoring capability for UEs may be defined, e.g., for both 15 and 30 KHz SCS. For example, the number of non-overlapping CCEs and BDs per slot may be increased relative to the second mobile communication capability and, in addition, a per span CCE and BD limit may be defined (rather than per slot, which may decrease UE complexity).

For UE capabilities of the first mobile communication capability, the supported span patterns of value pairs may be the same as those supported in the second mobile communication capability—that is, value pairs (2, 2), (4, 3), and (7, 3). If a UE indicates that the UE supports multiple value pairs, and multiple value pairs are valid for a given span pattern based on search space/CORESET configurations, the UE should assume the value pair with the largest number of CCEs and BD limits.

Some UEs may be able to transmit a UE Capability Information message to indicate two separate cases: (1) the capability on the number of CCs with the second mobile communication capability monitoring capability only; and (2) the capability on the number of CCs with the first mobile communication capability monitoring capability only, with the number of different serving cells being less than 4 (e.g., pdcch-BlindDetectionCA-RA16 may be less than or equal to 4).

Referring again to FIG. 4, however, the UE 404 may be able to transmit the UE Capability Information message 424 to separately indicate a capability on the number of CCs for control channel monitoring capability with the second mobile communication capability and the number of CCs for control channel monitoring capability with the first mobile communication capability on different serving cells (e.g., pdcch-BlindDetectionCA-RA16 for control channel monitoring capability on CCs configured according to the first mobile communication capability, and pdcch-BlindDetectionCA-RA15 for control channel monitoring capability on CCs configured according to the second mobile communication capability). In some aspects, each of the capability on the number of CCs for control channel monitoring capability with the second mobile communication capability and the number of CCs for control channel monitoring capability with the first mobile communication capability may be configured at most 4 serving cells.

In some aspects, for the second mobile communication capability, a UE is only able to report UE capability information in one of three different sets of value pairs: {(7, 3)}, {(4, 3), (7, 3)}, and {(2, 2), (4, 3), (7, 3)}. The UE capability information may be constrained to these three sets of value pairs because the limits on the numbers of CCEs and BDs are defined per slot. However, for the first mobile communication capability, the limits on the numbers of CCEs and BDs may be defined per span, and therefore, may be different for different value pairs. Accordingly, a UE may be able to indicate support for each value pair separately and independently, e.g., on a per span basis. The UE 404 may indicate support in relation to the number of CCEs (referred to as "C" or "limit C") and the number of BDs (referred to as "M" or "limit M"). The UE may indicate support of value pairs for specific SCSs (denoted with $\mu$).

In one example, the UE 404 may be able to report, in the UE Capability Information message 424, support of the first mobile communication capability in a first example feature group (e.g., a feature group having a specific value or other indication) that indicates an increased control channel (e.g., PDCCH) monitoring capability. For example, the first example feature group may indicate that the UE 404 supports: (1) the limit C on the maximum number of non-overlapped CCEs for channel estimation per control channel monitoring span and the limit M on the maximum number of BDs for value pair combination (X, Y, $\mu$); (2) one or more combinations of (X, Y, $\mu$); and (3) if the UE reports the support of more than one combination of (X, Y) for a given SCS, and if multiple combinations of (X, Y) are valid for a supported span pattern, the span pattern with the maximum value of C and M from the valid combinations.

The first example feature group may be used for SCSs of 15 KHz and 30 KHz. The UE 404 may indicate a candidate value set (e.g., component-2 candidate value set) with the first feature group through value pairs {(2, 2), (4, 3), (7, 3)}.

When the UE 404 indicates the first example feature group example in the UE Capability Information message 424, the UE 404 may additionally indicate support for control channel monitoring on CCs of another serving cell configured for the second mobile communication capability. For example, the first example feature group may indicate that the UE 404 supports the fifth feature group of the second mobile communication capability (e.g., feature group 3-5b), which indicates all control channel (e.g., PDCCH) monitoring occasions can be any OFDM symbol(s) of a slot with a span gap (e.g., for Case 2).

In another example, the UE 404 may be able to report, in the UE Capability Information message 424, support of the first mobile communication capability in a second example feature group (e.g., another feature group having a specific value or other indication) that indicates a combination of increased control channel monitoring capability and monitoring capabilities of the first three symbols of a slot (e.g., feature group 3-1) in the same slot of the same CC. For example, the second example feature group may indicate that the UE 404 supports: (1) control channel monitoring operation according to the first three symbols of a slot (e.g., feature group 3-1); 2) control channel monitoring with limit C on the maximum number of additional non-overlapped CCEs for channel estimation per control channel monitoring span and with limit M on the maximum number of additional BDs, for a value pair combination (X, Y, μ); (3) one or more combinations of (X, Y, μ); and (4) if more than one value pair combination of (X, Y) for a given SCS is supported, and if multiple combinations of (X, Y) are valid for the span pattern, the span pattern with the maximum value of C and M from the valid combinations is applied.

The second example feature group may be used for SCSs of 15 KHz and 30 KHz. The UE 404 may indicate a candidate value set (e.g., component-3 candidate value set) with the second feature group through value pairs {(2, 2), (4, 3), (7, 3)}.

When the UE 404 indicates the second example feature group example in the UE Capability Information message 424, the UE 404 may additionally indicate support for control channel monitoring on CCs of another serving cell configured for the second mobile communication capability. For example, the second example feature group may indicate that the UE 404 supports the fifth feature group of the second mobile communication capability (e.g., feature group 3-5b), which indicates all control channel (e.g., PDCCH) monitoring occasions can be any OFDM symbol(s) of a slot with a span gap (e.g., for Case 2).

In a further example, the UE 404 may be able to report, in the UE Capability Information message 424, support of the first mobile communication capability in a third example feature group (e.g., feature group with a specific value) that indicates a combination of increased control channel monitoring capability and monitoring capabilities of any three consecutive symbols of a slot (e.g., feature group 3-2) in the same slot of the same CC. For example, the third example feature group may indicate that the UE 404 supports: (1) control channel monitoring operation according to any three consecutive OFDM symbols of a slot (e.g., feature group 3-2); (2) PDCCH monitoring with limit C on the maximum number of additional non-overlapped CCEs for channel estimation per PDCCH monitoring span and with limit M on the maximum number of additional BDs, for a combination (X, Y, μ); (3) one or more combinations of (X, Y, μ); and (4) if more than one combination of (X, Y) is supported for a given SCS, and if multiple combinations of (X, Y) are valid for the span pattern, the span pattern with the maximum value of C and M from the valid combinations is applied.

The third example feature group may be used for SCSs of 15 KHz and 30 KHz. The UE 404 may indicate a candidate value set (e.g., component-3 candidate value set) with the third feature group through value pairs {(2, 2), (4, 3), (7, 3)}.

When the UE 404 indicates the third example feature group example in the UE Capability Information message 424, the UE 404 may additionally indicate support for control channel monitoring on CCs of another serving cell configured for the second mobile communication capability. For example, the third example feature group may indicate that the UE 404 supports control channel monitoring of any 3 consecutive OFDM symbols of a slot (e.g., feature group 3-2) and, further, supports the fifth feature group of the second mobile communication capability (e.g., feature group 3-5b), which indicates all control channel (e.g., PDCCH) monitoring occasions can be any OFDM symbol(s) of a slot with a span gap (e.g., for Case 2).

In still another example, the UE 404 may be able to report, in the UE Capability Information message 424, support of the first mobile communication capability in a fourth example feature group (e.g., feature group with a specific value) that indicates a mix of increased control channel monitoring capability and monitoring capabilities of all control channel monitoring occasions can be any OFDM symbol(s) of a slot for Case 2 with a span gap in the same slot of the same CC. For example, the fourth example feature group may indicate that the UE 404 supports: (1) control channel monitoring operation according to all control channel monitoring occasions, which can be any OFDM symbol(s) of a slot with a span gap (e.g., feature group 3-5b) for combination (X1, Y1, μ) (e.g., for Case 2); (2) PDCCH monitoring with limit C on the maximum number of additional non-overlapped CCEs for channel estimation per PDCCH monitoring span and with limit M on the maximum number of additional BDs, for a combination (X, Y, μ); (3) one or more combinations of (X1, Y1, μ); (4) one or more combinations of (X2, Y2, μ); and (5) if more than one combination of (X2, Y2) is supported for a given SCS, and if multiple combinations of (X2, Y2) are valid for the span pattern, the span pattern with the maximum value of C and M from the valid combinations is applied.

Illustratively, the UE 404 may indicate the support of, e.g., (X1,Y1)=(7,3) and (X2,Y2)=(2,2) with the first number of carriers and the support of (X1,Y1)=(7,3) and (X2,Y2)=(7,3) with the second number of carriers, and so on. In some aspects, the UE 404 may further indicate support of one or more value pairs (X2,Y2) with the first number of carriers and support, with the second number of carriers, of monitoring/decoding the first three OFDM symbols of a slot (e.g., feature group 3-1), monitoring/decoding any three consecutive OFDM symbols of a slot (e.g., feature group 3-2), monitoring/decoding any OFDM symbol(s) of a slot for Case 2 (e.g., feature group 3-5), monitoring/decoding any OFDM symbol(s) of a slot for Case 2 with a DCI gap (e.g., feature-group 3-5a), and/or monitoring/decoding any OFDM symbol(s) of a slot for Case 2 with a span gap (e.g., feature group 3-5b).

The fourth example feature group may be used for SCSs of 15 KHz and 30 KHz. The UE 404 may indicate a candidate value set (e.g., component-3 candidate value set)

with the fourth feature group through value pairs of (X1, Y1) of {(2, 2), (4, 3), (7, 3)} and, in addition, candidate value set (e.g., component-4 candidate value set) with value pairs of (X2, Y2) of {(2, 2), (4, 3), (7, 3)}.

When the UE 404 indicates the fourth example feature group example in the UE Capability Information message 424, the UE 404 may additionally indicate support for control channel monitoring on CCs of another serving cell configured for the second mobile communication capability. For example, the fourth example feature group may indicate that the UE 404 supports control channel monitoring of the fifth feature group of the second mobile communication capability (e.g., feature group 3-which indicates all control channel (e.g., PDCCH) monitoring occasions can be any OFDM symbol(s) of a slot for Case 2 with a span gap.

For any of the aforementioned examples, the UE 404 may report, in the UE Capability Information message 424, supported value pairs (X,Y) separately for the first mobile communication capability and the second mobile communication capability. For example, the UE 404 may indicate support of all (X, Y) value pairs for Case 2 reporting, two of them in a mixed mode with monitoring occasions being the first 3 OFDM symbols of a slot (e.g., feature group 3-1) and only one of them in a mixed mode with all control channel (e.g., PDCCH) monitoring occasions can be any OFDM symbol(s) of a slot for Case 2 with a span gap (e.g., feature group 3-5b).

In addition, in a mixed mode (e.g., for the fourth example feature group), the UE 404 may report, in the UE Capability Information message 424, which of the (X2, Y2) value pairs may be supported with each of the (X1, Y1)=(7, 3) and the UE 404 may support (X2, Y2)=(7, 3) with {(2, 2), (4, 3), (7, 3)}. In some other aspects, the UE 404 may report, in the UE Capability Information message 424, (X1, Y1) and (X2, Y2) separately and independently; however, the UE 404 may then support all value pairs reported by the UE 404.

In some aspects, the UE 404 may indicate that the UE 404 supports at least one of the foregoing example feature groups in a feature set that corresponds to a subset of the set of bands in the band combination (e.g., indicated by the network 406 in the request 422) for each of the first base station 402a and the second base station 402b. In some further aspects, the UE 404 may indicate that the UE 404 supports at least one of the foregoing example feature groups in a feature set that corresponds to a respective set of carriers in each of the subset(s) of the set of bands in the band combination for each of the first base station 402a and the second base station 402b.

In some other aspects, the UE 404 may indicate a single feature group in the UE Capability Information message 424. For example, a new value pair of (X, Y)=(14, 3) may be defined (e.g., which may correspond to the second mobile communication capability)—that is, a single location for a control channel monitoring occasion, e.g., for the first three OFDM symbols of a slot (e.g., feature group 3-1) and for any three consecutive OFDM symbols of a slot (e.g., feature group 3-2). The UE 404 may then indicate, in the UE Capability Information message 424, whether the UE 404 supports any of the (X2, Y2) value pairs with the value pair of (14, 3). If the UE 404 does support value pair(s) with the value pair (14, 3), then the UE 404 may support a single location for monitoring occasion on CCs configured for the second mobile communication capability. The UE 404 may report support for all control channel (e.g., PDCCH) monitoring occasions can be any OFDM symbol(s) of a slot for Case 2 with a span gap (e.g., feature group 3-5b) under a combined feature group or separately.

Figure 6:
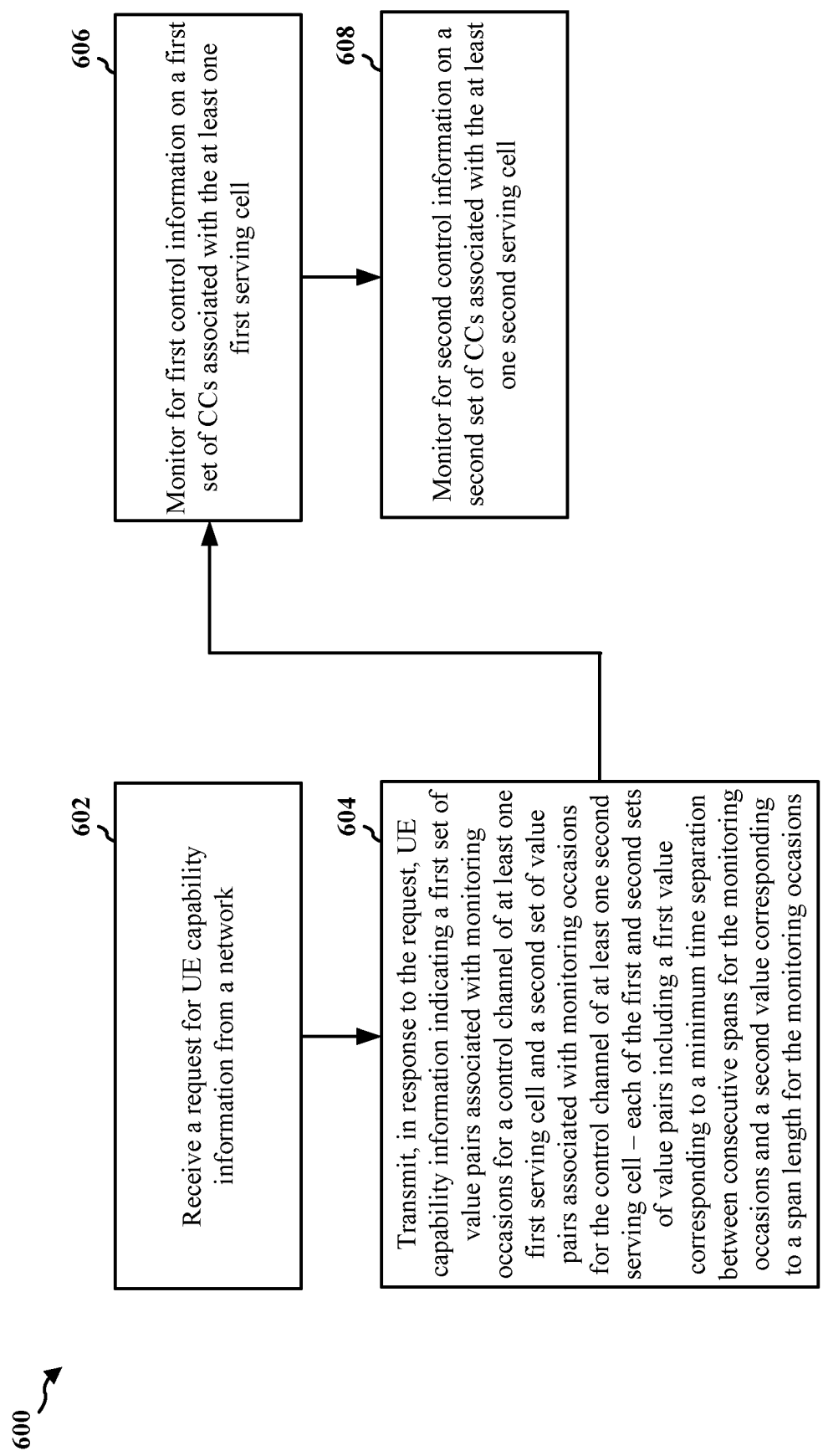
FIG. 6 is a flowchart of an example method of wireless communication by a UE.

FIG. 6 is a flowchart of an example method 600 of wireless communication. The method 600 may be performed by a UE (e.g., the UE 104, the UE 350, the UE 404) and/or other apparatus (e.g., the apparatus 702). According to different aspects, one or more of the illustrated operations may be transposed, omitted, and/or contemporaneously performed.

At 602, the UE may receive a request for UE capability information from a network. For example, the request for UE capability information may include a UE Capability Enquiry message, which may be received from the network through at least one base station. In some aspects, the UE may receive the request for UE capability information based on attachment to the network by the UE. For example, referring to FIG. 4, the UE 404 may receive the request 422 for UE capability information from the network 406, e.g., through at least one of the base stations 402a-b.

At 604, the UE may transmit, in response to the request, UE capability information indicating a first set of value pairs associated with monitoring occasions for a control channel of at least one first CC associated with at least one first serving cell and a second set of value pairs associated with monitoring occasions for the control channel of at least one second CC associated with at least one second serving cell, each of the first and second sets of value pairs including a first value corresponding to a minimum time separation between consecutive spans for the monitoring occasions and a second value corresponding to a span length for the monitoring occasions. For example, referring to FIG. 4, the UE 404 may transmit the UE Capability Information message 424 to the network 406, e.g., through at least one of the base stations 402a-b.

In some aspects, the UE capability information further indicates a respective set of bands in a band combination that corresponds to each of the first set of value pairs and the second set of value pairs. In some further aspects, the UE capability information further indicates, for each of the first set of value pairs and the second set of value pairs, a corresponding set of CCs in the each band of the respective set of bands.

According to some aspects, the UE capability information further indicates, for each of the second set of values pairs, a respective subset of the first set of values pairs that is supported. According to some other aspects, each of the second set of value pairs is independent of each of the first set of value pairs.

Potentially, the UE capability information may further indicate at least one of a respective subcarrier spacing corresponding to each of the first set of value pairs and a respective subcarrier spacing corresponding to each of the second set of value pairs. In one configuration, the first set of value pairs may be a single value pair for a single monitoring occasion per slot for the first control channel. The UE capability information may further indicate, for each of the second set of value pairs, whether the single value pair is supported.

In some aspects, the first set of value pairs is associated with a first number of CCEs and a first number of BDs that are defined per slot, and the second set of value pairs is associated with a second number of CCEs and a second number of BDs that are defined per span, and wherein the first number of CCEs is less than the second number of CCEs and the first number of BDs is less than the second number of BDs. For example, the first set of value pairs is associated with CCs of a first mobile communication capability of a RAT, and the second set of value pairs is associated with CCs of a second mobile communication capability of the RAT.

In some other aspects, the UE capability information further indicates at least one first feature group corresponding to the at least one first CC, and the UE capability information separately indicates the at least one featuring group corresponding to the at least one second CC. For example, the at least one feature group defines at least one of: the monitoring occasions are within a first three OFDM symbols of a slot, the monitoring occasions are within a same span of three consecutive symbols in a slot, the monitoring occasions are within any symbols in a slot, the monitoring occasions are within any symbols in a slot with a DCI gap, or the monitoring occasions are within any symbols in a slot with a span gap.

At 606, the UE may monitor for first control information on a first set of CCs associated with the at least one first serving cell. For example, the UE may receive information indicating a first CORESET associated with the first control information on the first set of CCs, e.g., based on the UE capability information. The UE may perform one or more BDs of CCEs associated with the first CORESET, e.g., during at least one monitoring occasion associated with the at least one first CC, and the UE may detect the first control information based on the one or more BDs of the CCEs associated with the first CORESET. For example, referring to FIG. 4, the UE 404 may monitor for first control information on a first set of CCs associated with the first base station 402a of the network 406.

At 608, the UE may monitor for second control information on a second set of CCs associated with the at least one second serving cell. For example, the UE may receive information indicating a second CORESET associated with the second control information on the second set of CCs, e.g., based on the UE capability information. The UE may perform one or more BDs of CCEs associated with the second CORESET, e.g., during at least one monitoring occasion associated with the at least one second CC, and the UE may detect the second control information based on the one or more BDs of the CCEs associated with the second CORESET. For example, referring to FIG. 4, the UE 404 may monitor for second control information on a second set of CCs associated with the second base station 402b of the network 406.

Figure 7:
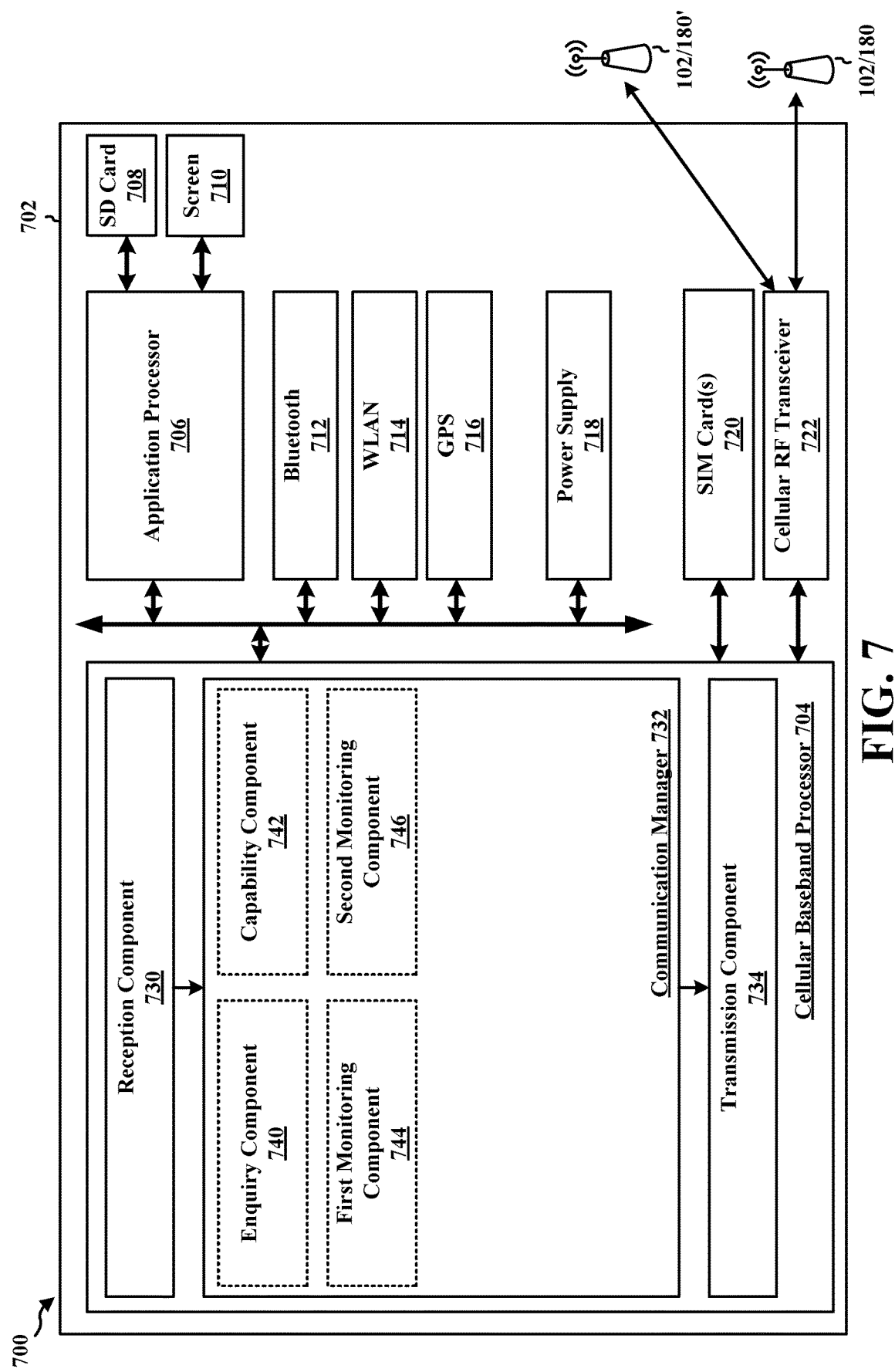
FIG. 7 is a diagram illustrating an example of a hardware implementation for an example apparatus.

FIG. 7 is a diagram 700 illustrating an example of a hardware implementation for an apparatus 702. The apparatus 702 is a UE and includes a cellular baseband processor 704 (also referred to as a modem) coupled to a cellular RF transceiver 722 and one or more subscriber identity modules (SIM) cards 720, an application processor 706 coupled to a secure digital (SD) card 708 and a screen 710, a Bluetooth module 712, a wireless local area network (WLAN) module 714, a Global Positioning System (GPS) module 716, and a power supply 718. The cellular baseband processor 704 communicates through the cellular RF transceiver 722 with the UE 104 and/or base station 102/180. The cellular baseband processor 704 may include a computer-readable medium/memory. The computer-readable medium/memory may be non-transitory. The cellular baseband processor 704 is responsible for general processing, including the execution of software stored on the computer-readable medium/memory. The software, when executed by the cellular baseband processor 704, causes the cellular baseband processor 704 to perform the various functions described supra. The computer-readable medium/memory may also be used for storing data that is manipulated by the cellular baseband processor 704 when executing software. The cellular baseband processor 704 further includes a reception component 730, a communication manager 732, and a transmission component 734. The communication manager 732 includes the one or more illustrated components. The components within the communication manager 732 may be stored in the computer-readable medium/memory and/or configured as hardware within the cellular baseband processor 704. The cellular baseband processor 704 may be a component of the UE 350 and may include the memory 360 and/or at least one of the TX processor 368, the RX processor 356, and the controller/processor 359. In one configuration, the apparatus 702 may be a modem chip and include just the baseband processor 704, and in another configuration, the apparatus 702 may be the entire UE (e.g., the UE 350 of FIG. 3) and include the aforediscussed additional modules of the apparatus 702.

The communication manager 732 may include an enquiry component 740 that is configured to receive a request for UE capability information from a network, e.g., as described in connection with 602 of FIG. 6. For example, the request for UE capability information may include a UE Capability Enquiry message, which may be received from the network through at least one of the base stations 102/180, 102/180'.

The communication manager 732 may further include a capability component 742 that receives input(s) of the request from the network from the enquiry component 740. The capability component 742 may be configured to transmit, in response to the request, UE capability information indicating a first set of value pairs associated with monitoring occasions for a control channel of at least one first CC associated with at least one first serving cell and a second set of value pairs associated with monitoring occasions for the control channel of at least one second CC associated with at least one second serving cell, each of the first and second sets of value pairs including a first value corresponding to a minimum time separation between consecutive spans for the monitoring occasions and a second value corresponding to a span length for the monitoring occasions, e.g., as described in connection with 604 of FIG. 6.

The communication manager 732 may further include a first monitoring component 744 that is configured to monitor for first control information on a first set of CCs associated with the at least one first serving cell of the first base station 102/180, e.g., as described in connection with 606 of FIG. 6. For example, the UE may receive information indicating a first CORESET associated with the first control information on the first set of CCs, e.g., based on the UE capability information.

The communication manager 732 may further include a second monitoring component 746 that is configured to monitor for second control information on a second set of CCs associated with the at least one second serving cell of the second base station 102/180', e.g., as described in connection with 608 of FIG. 6. For example, the UE may receive information indicating a second CORESET associated with the second control information on the second set of CCs, e.g., based on the UE capability information.

The apparatus 702 may include additional components that perform some or all of the blocks, operations, signaling, etc. of the algorithm(s) in the aforementioned call flow diagram and flowchart of FIGS. 4 and 6. As such, some or all of the blocks, operations, signaling, etc. in the aforementioned call flow diagram and flowchart of FIGS. 4 and 6 may be performed by a component and the apparatus 702 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 702, and in particular the cellular baseband processor 704, includes means for receiving a request for UE capability information from a network; and means for transmitting, in response to the request, UE capability information indicating a first set of value pairs associated with monitoring occasions for a control channel of at least one first CC and a second set of value pairs associated with monitoring occasions for a control channel of at least one second CC, each of the first and second sets of value pairs including a first value corresponding to a minimum time separation between consecutive spans for the monitoring occasions and a second value corresponding to a span length for the monitoring occasions.

In one configuration, the UE capability information further indicates a respective set of bands in a band combination that corresponds to each of the first set of value pairs and the second set of value pairs.

In one configuration, the UE capability information further indicates, for each of the first set of value pairs and the second set of value pairs, a corresponding set of CCs in the each band of the respective set of bands.

In one configuration, the UE capability information further indicates, for each of the second set of values pairs, a respective subset of the first set of values pairs that is supported.

In one configuration, each of the second set of value pairs is independent of each of the first set of value pairs.

In one configuration, the UE capability information further indicates at least one of a respective subcarrier spacing corresponding to each of the first set of value pairs and a respective subcarrier spacing corresponding to each of the second set of value pairs.

In one configuration, the first set of value pairs is a single value pair for a single monitoring occasion per slot for the first control channel.

In one configuration, the UE capability information further indicates, for each of the second set of value pairs, whether the single value pair is supported.

In one configuration, the first set of value pairs is associated with a first number of CCEs and a first number of BDs that are defined per slot, and the second set of value pairs is associated with a second number of CCEs and a second number of BDs that are defined per span, and wherein the first number of CCEs is less than the second number of CCEs and the first number of BDs is less than the second number of BDs.

In one configuration, the first set of value pairs is associated with CCs of a first mobile communication capability of a RAT, and the second set of value pairs is associated with CCs of a second mobile communication capability of the RAT.

In one configuration, the UE capability information further indicates at least one first feature group corresponding to the at least one first CC, and the UE capability information separately indicates the at least one featuring group corresponding to the at least one second CC.

In one configuration, the at least one feature group defines at least one of: the monitoring occasions are within a first three OFDM symbols of a slot, the monitoring occasions are within a same span of three consecutive symbols in a slot, the monitoring occasions are within any symbols in a slot, the monitoring occasions are within any symbols in a slot with a DCI gap, or the monitoring occasions are within any symbols in a slot with a span gap.

The aforementioned means may be one or more of the aforementioned components of the apparatus 702 configured to perform the functions recited by the aforementioned means. As described supra, the apparatus 702 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication by a user equipment (UE), comprising:
receiving a request for UE capability information from a network;
transmitting, in response to the request, UE capability information indicating a first set of value pairs associated with monitoring occasions for a control channel of at least one first component carrier (CC) and a second set of value pairs associated with monitoring occasions for a control channel of at least one second CC, each of the first and second sets of value pairs including a first value corresponding to a minimum time separation between consecutive spans for monitoring occasions and a second value corresponding to a span length for monitoring occasions, wherein each of the second set of value pairs is indicated separately and independently from other value pairs of the second set of value pairs; and
wherein the UE capability information further indicates a respective set of bands in a band combination that corresponds to each of the first set of value pairs and the second set of value pairs.

2. The method of claim 1, wherein the UE capability information further indicates, for each of the first set of value pairs and the second set of value pairs, a corresponding set of CCs in the each band of the respective set of bands.

3. The method of claim 1, wherein each of the second set of value pairs is independent of each of the first set of value pairs.

4. The method of claim 1, wherein the UE capability information further indicates at least one of a subcarrier spacing corresponding to each of the first set of value pairs and subcarrier spacing corresponding to each of the second set of value pairs.

5. A method of wireless communication by a user equipment (UE), comprising:
receiving a request for UE capability information from a network;
transmitting, in response to the request, UE capability information indicating a first set of value pairs associated with monitoring occasions for a control channel of at least one first component carrier (CC) and a second set of value pairs associated with monitoring occasions for a control channel of at least one second CC, each of the first and second sets of value pairs including a first value corresponding to a minimum time separation between consecutive spans for monitoring occasions and a second value corresponding to a span length for monitoring occasions, wherein each of the second set of value pairs is indicated separately and independently from other value pairs of the second set of value pairs;
wherein the first set of value pairs is a single value pair for a single monitoring occasion per slot for the control channel of the at least one first component carrier; and
wherein the UE capability information further indicates, for each of the second set of value pairs, whether the single value pair is supported.

6. The method of claim 1, wherein the first set of value pairs is associated with a first number of control channel elements (CCEs) and a first number of blind decodes (BDs) for one slot, and the second set of value pairs is associated with a second number of CCEs and a second number of BDs for one span, and wherein the first number of CCEs is increased relative to the second number of CCEs and the first number of BDs is increased relative to the second number of BDs.

7. The method of claim 1, wherein the first set of value pairs is associated with CCs of a first mobile communication capability of a radio access technology (RAT), and the second set of value pairs is associated with CCs of a second mobile communication capability of the RAT.

8. The method of claim 1, wherein the UE capability information further indicates at least one first feature group corresponding to the at least one first CC, and the UE capability information separately indicates the at least one feature group corresponding to the at least one second CC.

9. The method of claim 8, wherein the at least one feature group indicates at least one capability of at least one of:
the monitoring occasions being within a first 3 OFDM symbols of a slot,
the monitoring occasions being within a same span of 3 consecutive symbols in a slot,
the monitoring occasions being within any symbols in a slot,
the monitoring occasions being within any symbols in a slot with a downlink control information (DCI) gap, or
the monitoring occasions being within any symbols in a slot with a span gap.

10. An apparatus for wireless communication by a user equipment (UE), comprising:
a memory; and
at least one processor coupled to the memory and configured to:
receive a request for UE capability information from a network;
transmit, in response to the request, UE capability information indicating a first set of value pairs associated with monitoring occasions for a control channel of at least one first component carrier (CC) and a second set of value pairs associated with monitoring occasions for a control channel of at least one second CC, each of the first and second sets of value pairs including a first value corresponding to a minimum time separation between consecutive spans for monitoring occasions and a second value corresponding to a span length for monitoring occasions, wherein each of the second set of value pairs is indicated separately and independently from other value pairs of the second set of value pairs; and
wherein the UE capability information further indicates a respective set of bands in a band combination that corresponds to each of the first set of value pairs and the second set of value pairs.

11. The apparatus of claim 10, wherein the UE capability information further indicates, for each of the first set of value pairs and the second set of value pairs, a corresponding set of CCs in the each band of the respective set of bands.

12. The apparatus of claim 10, wherein each of the second set of value pairs is independent of each of the first set of value pairs.

13. The apparatus of claim 10, wherein the UE capability information further indicates at least one of a subcarrier spacing corresponding to each of the first set of value pairs and subcarrier spacing corresponding to each of the second set of value pairs.

14. An apparatus for wireless communication by a user equipment (UE), comprising:
a memory; and
at least one processor coupled to the memory and configured to:
receive a request for UE capability information from a network;

transmit, in response to the request, UE capability information indicating a first set of value pairs associated with monitoring occasions for a control channel of at least one first component carrier (CC) and a second set of value pairs associated with monitoring occasions for a control channel of at least one second CC, each of the first and second sets of value pairs including a first value corresponding to a minimum time separation between consecutive spans for monitoring occasions and a second value corresponding to a span length for monitoring occasions, wherein each of the second set of value pairs is indicated separately and independently from other value pairs of the second set of value pairs;

wherein the first set of value pairs is a single value pair for a single monitoring occasion per slot for the control channel of the at least one first component carrier; and wherein the UE capability information further indicates, for each of the second set of value pairs, whether the single value pair is supported.

15. The apparatus of claim 10, wherein the first set of value pairs is associated with a first number of control channel elements (CCEs) and a first number of blind decodes (BDs) for one slot, and the second set of value pairs is associated with a second number of CCEs and a second number of BDs for one span, and wherein the first number of CCEs is increased relative to the second number of CCEs and the first number of BDs is increased relative to the second number of BDs.

16. The apparatus of claim 10, wherein each of the first set of value pairs is indicated separately and independently from other value pairs in the first set of value pairs.

17. The apparatus of claim 10, wherein the first set of value pairs is associated with CCs of a first mobile communication capability of a radio access technology (RAT), and the second set of value pairs is associated with CCs of a second mobile communication capability of the RAT.

18. The apparatus of claim 10, wherein the UE capability information further indicates at least one first feature group corresponding to the at least one first CC, and the UE capability information separately indicates the at least one feature group corresponding to the at least one second CC.

19. The apparatus of claim 18, wherein the at least one feature group indicates at least one capability of at least one of:

the monitoring occasions being within a first 3 OFDM symbols of a slot,
the monitoring occasions being within a same span of 3 consecutive symbols in a slot,
the monitoring occasions being within any symbols in a slot,
the monitoring occasions being within any symbols in a slot with a downlink control information (DCI) gap, or
the monitoring occasions being within any symbols in a slot with a span gap.

20. An apparatus for wireless communication by a user equipment (UE), comprising:

means for receiving a request for UE capability information from a network;
means for transmitting, in response to the request, UE capability information indicating a first set of value pairs associated with monitoring occasions for a control channel of at least one first component carrier (CC) and a second set of value pairs associated with monitoring occasions for a control channel of at least one second CC, each of the first and second sets of value pairs including a first value corresponding to a minimum time separation between consecutive spans for monitoring occasions and a second value corresponding to a span length for monitoring occasions, wherein each of the second set of value pairs is indicated separately and independently from other value pairs of the second set of value pairs; and wherein the first set of value pairs is associated with a first number of control channel elements (CCEs) and a first number of blind decodes (BDs) for one slot, and the second set of value pairs is associated with a second number of CCEs and a second number of BDs for one span, and wherein the first number of CCEs is increased relative to the second number of CCEs and the first number of BDs is increased relative to the second number of BDs.

21. The apparatus of claim 20, wherein each of the first set of value pairs is indicated separately and independently from other value pairs in the first set of value pairs.

22. A non-transitory computer-readable medium storing computer-executable code for wireless communication by a user equipment (UE), the code when executed by a processor causes the processor to:

receive a request for UE capability information from a network;
transmit, in response to the request, UE capability information indicating a first set of value pairs associated with monitoring occasions for a control channel of at least one first component carrier (CC) and a second set of value pairs associated with monitoring occasions for a control channel of at least one second CC, each of the first and second sets of value pairs including a first value corresponding to a minimum time separation between consecutive spans for monitoring occasions and a second value corresponding to a span length for monitoring occasions, wherein each of the second set of value pairs is indicated separately and independently from other value pairs of the second set of value pairs; and wherein the first set of value pairs is associated with a first number of control channel elements (CCEs) and a first number of blind decodes (BDs) for one slot, and the second set of value pairs is associated with a second number of CCEs and a second number of BDs for one span, and wherein the first number of CCEs is increased relative to the second number of CCEs and the first number of BDs is increased relative to the second number of BDs.

23. The non-transitory computer-readable medium of claim 22, wherein each of the first set of value pairs is indicated separately and independently from other value pairs in the first set of value pairs.

24. The method of claim 1, wherein each of the first set of value pairs is indicated separately and independently from other value pairs in the first set of value pairs.

* * * * *